United States Patent
Yabuuchi et al.

(10) Patent No.: US 9,369,607 B2
(45) Date of Patent: Jun. 14, 2016

(54) IMAGE READING DEVICE, IMAGE FORMING APPARATUS, AND IMAGE READING METHOD

(71) Applicant: KYOCERA Document Solutions Inc., Osaka (JP)

(72) Inventors: Yasuyuki Yabuuchi, Osaka (JP); Shinichi Kimura, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/921,559

(22) Filed: Oct. 23, 2015

(65) Prior Publication Data
US 2016/0127606 A1    May 5, 2016

(30) Foreign Application Priority Data
Oct. 30, 2014  (JP) .................................. 2014-221752

(51) Int. Cl.
*G06K 15/00* (2006.01)
*H04N 1/387* (2006.01)

(52) U.S. Cl.
CPC ...... *H04N 1/3878* (2013.01); *H04N 2201/0081* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 6,678,071 | B1 * | 1/2004 | Saito | H04N 1/00737 358/1.2 |
| 8,634,650 | B2 * | 1/2014 | Konishi | G06K 9/32 382/195 |
| 8,773,739 | B2 * | 7/2014 | Motoyama | H04N 1/047 358/474 |
| 9,282,209 | B2 * | 3/2016 | Nagai | H04N 1/00652 358/488 |
| 2006/0017802 | A1 * | 1/2006 | Yoo | B41J 2/435 347/248 |
| 2010/0110506 | A1 * | 5/2010 | Katou | H04N 1/0057 358/488 |
| 2010/0142012 | A1 * | 6/2010 | Yamamoto | G06K 9/3275 358/498 |
| 2010/0271646 | A1 * | 10/2010 | Morimoto | G03G 15/5025 358/1.9 |
| 2012/0120444 | A1 * | 5/2012 | Hirohata | G06K 9/00449 358/1.15 |

FOREIGN PATENT DOCUMENTS

JP          2013-123119 A        6/2013

* cited by examiner

*Primary Examiner* — Doug Tran

(57) ABSTRACT

An reading device includes: a reading region setting section setting a reading region set under an inclination correction by an inclination correction section to be larger than a reading region set without the inclination correction, an image reading section reading a document in the reading region to generate image data, and a determination section defining a target region from a whole region of the image data and analyzing a portion of the image data corresponding to the document in the target region thereby determining an attribute of the image data, defining, without the inclination correction, a region obtained by inwardly narrowing the whole region of the image data by a predefined first region as the target region, and defining, under the inclination correction, a region obtained by inwardly narrowing the whole region of the image data by a second region larger than the first region as the target region.

7 Claims, 6 Drawing Sheets

IMAGE READING DEVICE, IMAGE FORMING APPARATUS, AND IMAGE READING METHOD

INCORPORATION BY REFERENCE

This application claims priority to Japanese Patent Application No. 2014-221752 filed on Oct. 30 2014, the entire disclosure of which are incorporated herein by reference.

BACKGROUND

This disclosure relates to an image reading device, an image forming apparatus including the image reading device, and an image reading method, and more specifically to a technology of analyzing image data generated by an image reading section, thereby determining an attribute of the image data.

There are image reading devices with inclination correction functions correcting, in accordance with inclination of a document, image data generated by image reading sections. Such image reading devices can correct directions of the image data, improving quality of the image data even for documents read in inclined states.

SUMMARY

As one aspect of this disclosure, a technology obtained by further improving the technology described above will be suggested.

An reading device according to one aspect of this disclosure includes: a reading region setting section, an image reading section, an inclination correction section, and a determination section.

The reading region setting section sets a reading region of a document to be read.

The image reading section reads the document in the reading region set by the reading region setting section to generate image data.

The inclination correction section subjects the image data generated by the image reading section to inclination correction processing in accordance with inclination of the document.

The determination section defines a target region from a whole region of the image data generated by the image reading section and analyzes a portion of the image data corresponding to the document in the target region, thereby determining an attribute of the image data.

The reading region setting section sets the reading region, which is set in a case where the inclination correction processing is executed, larger than the reading region, which is set in a case where the inclination correction processing is not executed.

The determination section defines, as the target region, a region obtained by inwardly narrowing the whole region of the image data by a predefined first region in a case where the inclination correction processing is not executed, and defines, as the target region, a region obtained by inwardly narrowing the whole region of the image data by a second region larger than the first region in a case where the inclination correction processing is executed.

An image forming apparatus according to another aspect of this disclosure includes: the image reading device described above; and an image formation section forming an image on recording paper based on the image data generated by the image reading device.

An image reading method according to still another aspect of this disclosure includes: a reading region setting step, an image reading step, an inclination correction step, and a determination step.

In the reading region setting step, a reading region of a document to be read is set.

In the image reading step, the document in the reading region set in the reading region setting step is read to generate image data.

In the inclination correction step, the image data generated in the image reading step is subjected to inclination correction processing in accordance with inclination of the document.

In the determination step, a target region is defined from a whole region of the image data generated in the image reading step and a portion of the image data corresponding to the document in the target region is analyzed, thereby determining an attribute of the image data.

In the reading region setting step, the reading region, which is set in a case where the inclination correction processing is executed, is set larger than the reading region, which is set in a case where the inclination correction processing is not executed.

In the determination step, a region obtained by inwardly narrowing the whole region of the image data by a predefined first region is defined as the target region in a case where the inclination correction processing is not executed, and a region obtained by inwardly narrowing the whole region of the image data by a second region larger than the first region is defined as the target region in a case where the inclination correction processing is executed.

DETAILED DESCRIPTION

Figure 1:
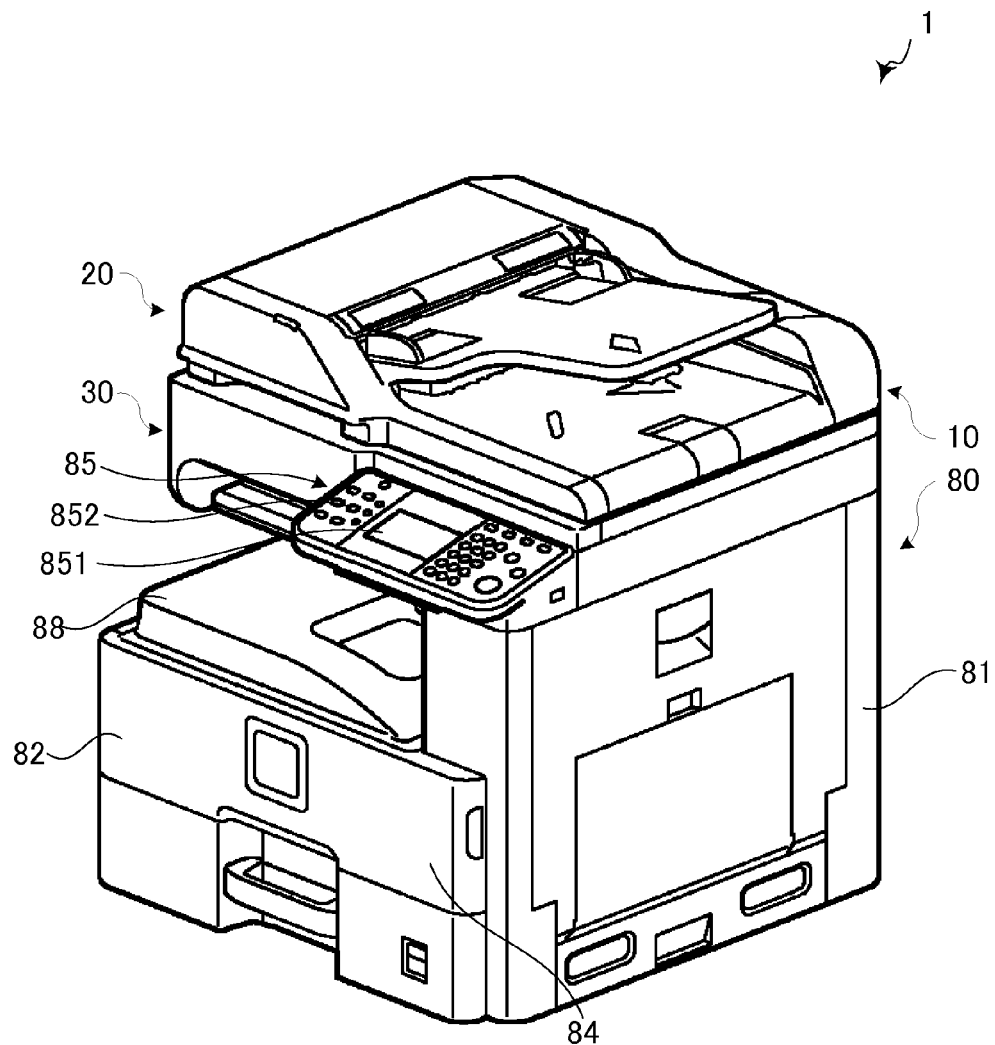
FIG. 1 is a perspective view showing an image forming apparatus including an image reading device according to one embodiment of this disclosure.

Hereafter, an image reading device, an image forming apparatus including this image reading device, and an image reading method according to one embodiment of this disclosure will be described with reference to the drawings. FIG. 1 is a perspective view showing the image forming apparatus including the image reading device according to one embodiment of this disclosure.

As shown in FIG. 1, the image forming apparatus 1 is generally formed of an apparatus body 80; and an image reading device 10 arranged on a top of the apparatus body 80.

Stored inside of a housing 81 forming an outline of the apparatus body 80 are: a paper feed section 82, an image formation section 84, etc.

The paper feed section 82 includes a paper feed cassette (not shown) storing paper (recording paper) and a feed roller (not shown), and feeds the paper stored in the paper feed cassette towards a paper conveyance path provided inside of the housing 81.

The image formation section 84 includes: a photoconductive drum (not shown), a charging device (not shown), an exposure device (not shown), a developing device (not shown), etc. The image formation section 84 forms, on the photoconductive drum through charging, exposure, and developing processes, a toner image based on image data generated by reading a document by the image reading device 10. Onto the paper conveyed from the paper feed section 82, the toner image formed on the photoconductive drum is transferred, and this paper is subjected to the exposure processing and then discharged to a discharge tray 88.

Arranged on a front surface of the housing 81 of the apparatus body 80 is an operation section 85. The operation section 85 includes: a display section 851 so formed as to include a liquid crystal display (LCD) and an organic light-emitting diode (OLED); and a plurality of operation keys 852 receiving, from a user, operation performed on a screen displayed at the display section 851.

Based on the operation screen displayed at the display section 851, through the user operation inputted through, for example, the operation keys 852, for example, an image reading instruction and an image formation instruction are inputted. These inputted instructions are received by a reception section 102 (see FIG. 4).

Figure 2:
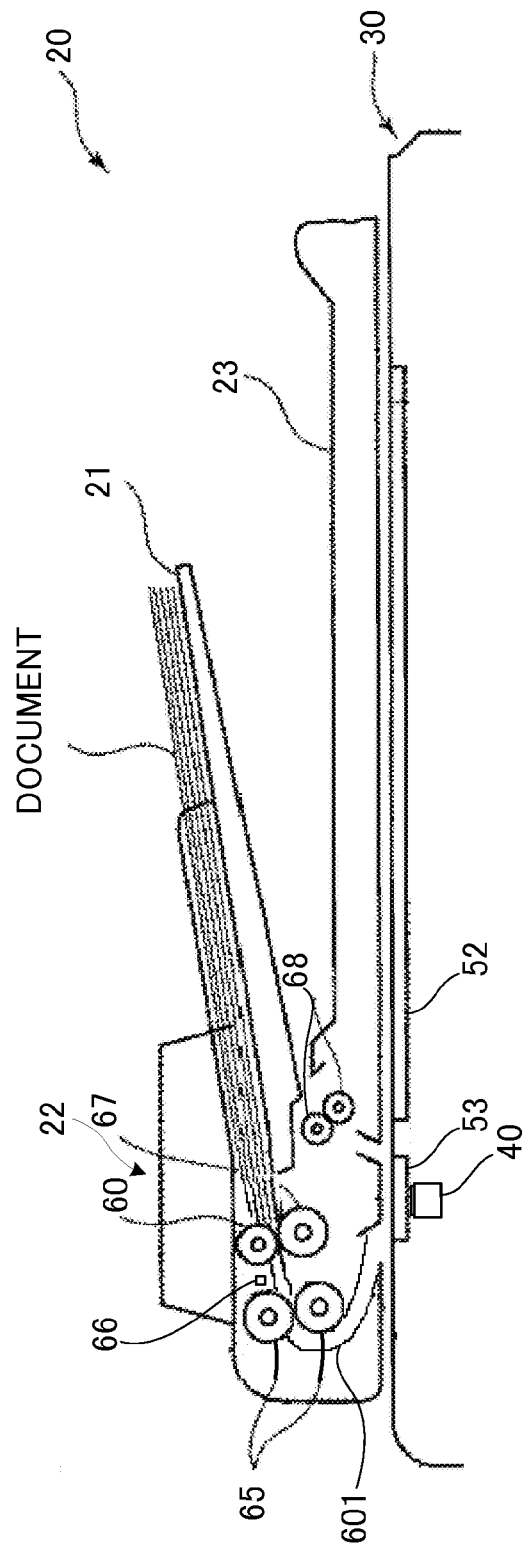
FIG. 2 is a side sectional view showing a structure of the image reading device according to one embodiment of this disclosure.

FIG. 2 is a side sectional view showing a structure of the image reading device 10 according to one embodiment of this disclosure. The image reading device 10 includes: an image reading section 30, and a document conveyance section 20 arranged on a top of the image reading section 30.

The image reading section 30 includes: a reading unit 40 composed of a charge coupled device (CCD), an image irradiation lamp, etc.; a document stand 52 formed of a transparent member such as glass; and a reading slit 53. The reading unit 40 is moved by a reading unit driving section (not shown) having a stepping motor, a gear, etc.

In document-fixed reading, the reading unit driving section moves the reading unit 40 in a sub-scanning direction from a predefined document size detection position. At this point, the reading unit 40 detects whether or not light is reflected on a document loaded on the document stand 52, and outputs a signal indicating a result of this detection. A document length detection section 105 (see FIG. 4), based on this signal, detects a length of the document, which is loaded on the document stand 52, in the sub-scanning direction, and a length thereof in a main-scanning direction. A reading region setting section 106 (see FIG. 4), based on the lengths of the document which have been detected by the document length detection section 105, sets a reading region of the document. Then the reading unit driving section moves the reading unit 40 in the sub-scanning direction from a predefined reading start position, and the document loaded on the document stand 52 is read.

On the other hand, in document-conveyed reading, the reading unit driving section fixes the reading unit 40 at a predefined position on a rear surface of the reading slit 53, and the document conveyed towards the reading slit 53 by the document conveyance section 20 is read.

The document conveyance section 20, as described above, conveys documents to the reading slit 53 as a reading region of the reading unit 40. The document conveyance section 20 includes: a document loading stand 21 which loads documents; a document conveyance mechanism 22 which conveys the documents loaded on the document loading stand 21; and a document discharge section 23 which discharges the documents whose image has already been read. The document conveyance mechanism 22 includes: a paper feed roller 60, a registration roller pair 65, a document detection sensor 66, a separation roller 67, a discharge roller pair 68, and a document conveyance path 601.

The paper feed roller 60 and the separation roller 67 are arranged in a pair in such a manner as to make contact with each other. The paper feed roller 60 and the separation roller 67, while handling the documents on the document loading stand 21 one by one, sandwich the handled documents at a nip part between the rollers and discharge the documents toward the registration roller pair 65.

The registration roller pair 65 is a roller which adjusts timing at which a document is conveyed to the reading slit 53. The registration roller pair 65 sandwiches documents at a nip part between the rollers thereof and conveys the documents toward the reading slit 53.

At a position of the reading slit 53, an image on a surface of the document conveyed in this manner from its tip to its rear end in a conveyance direction is read by the reading unit 40. The document which has passed through the reading slit 53 is received by the discharge roller pair 68, and is discharged to the document discharge section 23 by the discharge roller pair 68.

Figure 3:
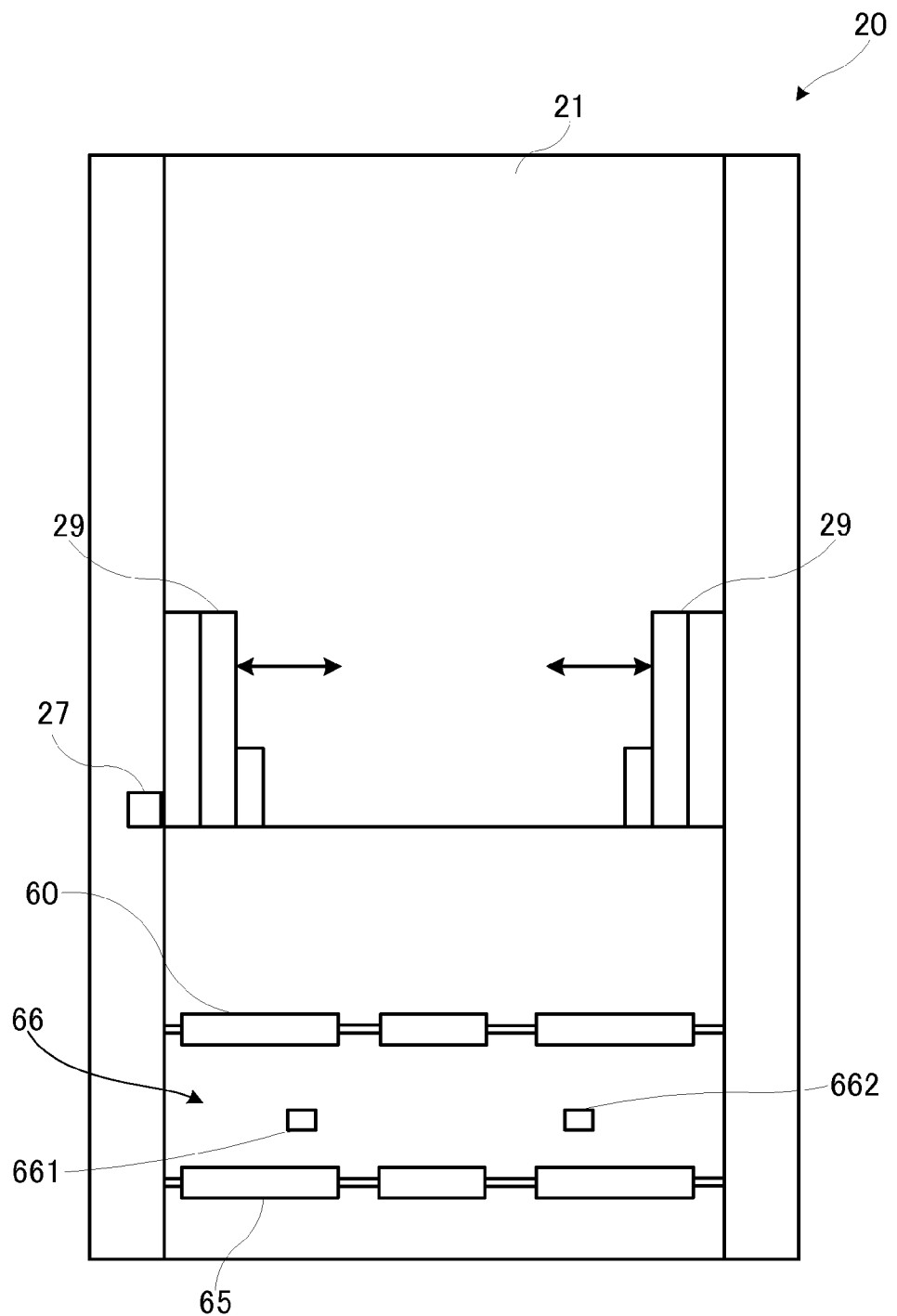
FIG. 3 is a plan sectional view showing arrangement positions of various sensors installed inside of a document conveyance section of the image reading device according to one embodiment of this disclosure.

Here, arranged inside of the document conveyance section 20 are a plurality of sensors for detecting a length of the document. FIG. 3 is a plan sectional view showing arrangement positions of the various sensors installed inside of the document conveyance section 20. As shown in this figure, arranged on the document loading stand 21 are: guide plates 29 which are capable of sliding in the main-scanning direction; and a guide plate detection sensor 27 which outputs a signal indicating a sliding position of the guide plates 29. The document length detection section 105, based on this signal outputted from the guide plate detection sensor 27, detects the length of the document, which is loaded on the document loading stand 21, in the main-scanning direction.

Moreover, arranged between a position at which the paper feed roller 60 and the separation roller 67 are arranged on the document conveyance path 601 and a position at which the registration roller pair 65 is arranged is the document detection sensor 66. The document detection sensor 66 is a line sensor having two optical sensors 661 and 662 provided in parallel in a direction orthogonal to the conveyance direction. The optical sensors 661 and 662 of the document detection sensor 66 output a high-level signal when they have detected the document and output a low-level signal when they have detected no document. The document length detection section 105 multiplies time for which the high-level signal is outputted from the optical sensors 661 and 662 of the document detection sensor 66 by a document conveyance speed, thereby detecting the length of the document in the sub-scanning direction (conveyance direction) in the document conveyance path 601.

Here, an increase in an inclination angle of the document with respect to the sub-scanning direction results in a large difference between timing at which switching from the low-level signal to the high-level signal occurs in the optical sensor 661 and timing at which switching from the low-level signal to the high-level signal occurs in the optical sensor 662. Similarly, the increase in the inclination angle of the document with respect to the sub-scanning direction results in a large difference between timing at which switching from the high-level signal to the low-level signal occurs in the optical sensor 661 and timing at which switching from the high-level signal to the low-level signal occurs in the optical sensor 662. That is, proportional relationship is established: between the inclination angle of the document and the difference between the optical sensors 661 and 662 in the timing at which the switching from the low-level signal to the high-level signal occurs; and between the inclination angle of the document and the difference between the optical sensors 661 and 662 in the timing at which the switching from the high-level signal to the low-level signal occurs. An inclination angle detection section 104 (see FIG. 4), based on the difference between the optical sensors 661 and 662 in the timing at which the switching from the low-level signal to the high-level signal occurs or the difference between the optical sensors 661 and 662 in the timing at which the switching from the high-level signal to the low-level signal occurs, detects the inclination angle of the document.

Figure 4:
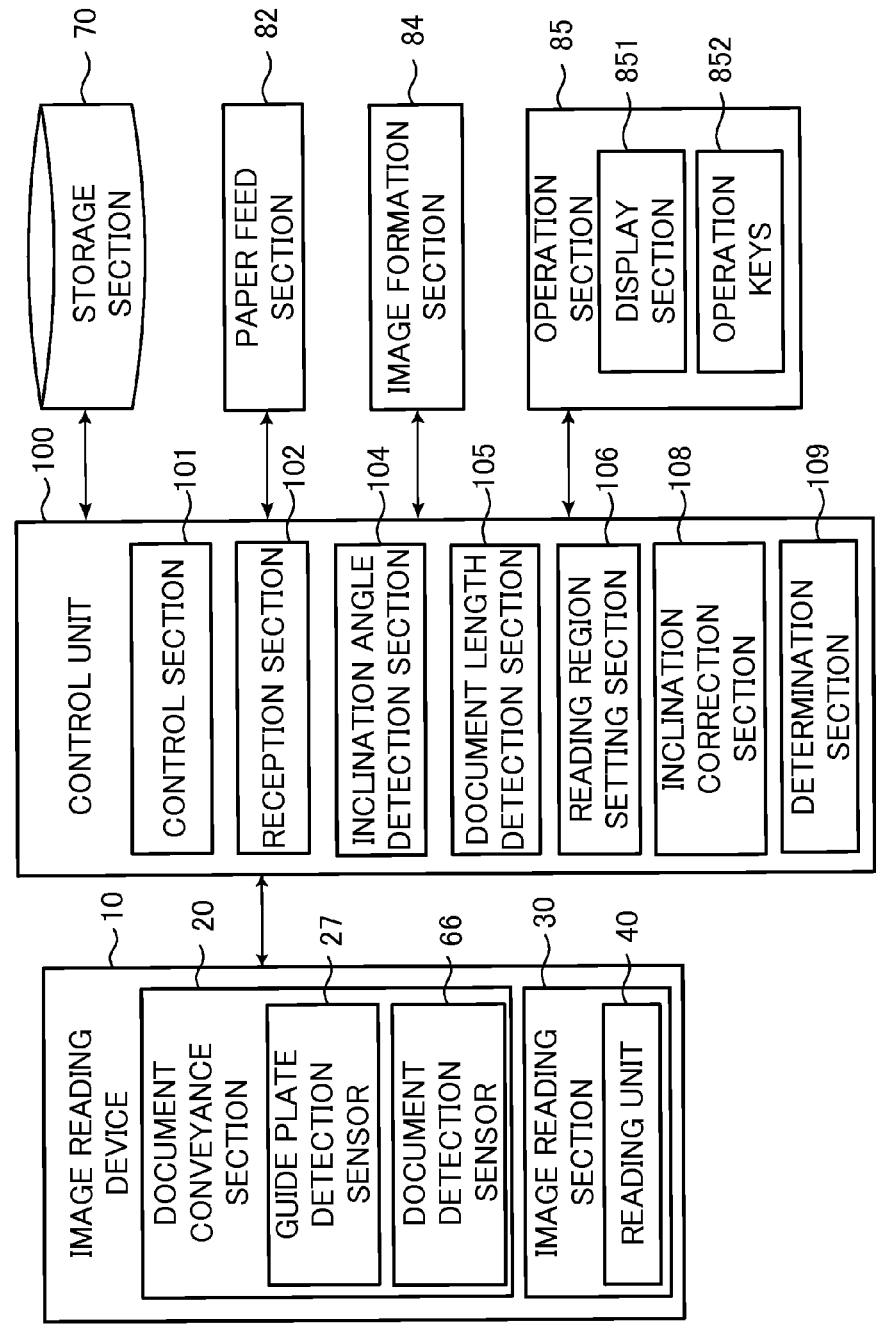
FIG. 4 is a functional block diagram schematically showing main inner configuration of the image reading device and the image forming apparatus according to one embodiment of this disclosure.

Next, inner configurations of the image reading device 10 and the image forming apparatus 1 will be described. FIG. 4 is a functional block diagram schematically showing main inner configuration of the image reading device 10 and the image forming apparatus 1 according to one embodiment of this disclosure. The configuration already described will be omitted from the description.

A storage section 70 is a large-capacity storage device such as a hard disk drive (HDD).

A control unit 100 is composed of a central processing unit (CPU), a random access memory (RAM), a read-only memory (ROM), etc. The control unit 100 functions as a control section 101, a reception section 102, the inclination angle detection section 104, the document length detection section 105, a reading region setting section 106, an inclination correction section 108, and a determination section 109 as a result of execution of a control program stored in, for example, the aforementioned ROM or HDD by the aforementioned CPU. Note that each configuration of the control unit 100 described above may be formed by a hard circuit without depending on operation based on the control program described above.

The control section 101 is in charge of overall operation control of the image reading device 10 and the image forming apparatus 1. The control section 101 is connected to the image reading device 10, the storage section 70, the paper feed section 82, the image formation section 84, the operation section 85, etc., and performs operation control of each of the connected mechanisms described above and performs signal or data transmission and reception to and from each mechanism.

The reception section 102 (instruction reception section), based on user operation inputted by use of, for example, the operation keys 852 in accordance with the operation screen displayed at the display section 851, receives: for example, the image reading instruction, the image formation instruction, an instruction for executing inclination correction processing in accordance with the inclination angle of the document with respect to the sub-scanning direction, an instruction for executing white paper data determination processing of determining whether or not the image data is white paper data, and an instruction for executing auto color selection (ACS) processing of determining whether the image data is color data or monochromatic data.

The reading region setting section 106 has a function of setting a range in which the document is read by the image reading section 30 based on the lengths of the document in the sub-scanning direction and the main-scanning direction which lengths have been detected by the original script length detection section 105.

The inclination correction section 108 executes the inclination correction processing on the image data generated by reading the document by the image reading section 30. More specifically, the inclination correction section 108 executes, for example, rotation processing and size adjustment processing in accordance with the inclination angle detected by the inclination angle detection section 104. The aforementioned processing performed by the inclination correction section 108 is performed in a case where the reception section 102 has received the instruction for executing the inclination correction processing and an inclination correction function is enabled.

The determination section 109 defines a target region from the whole region of the image data generated by the image reading section 30 and analyzes the image data corresponding to a document portion in this target region, thereby determining an attribute of the image data. The determination section 109 does not define the whole region of the image data as the target region to be analyzed but defines, as the target region, a region obtained by inwardly narrowing the whole region of the image data by a predefined region. This can improve determination accuracy at time of the determination of an attribute of the image data.

The determination section 109, for example, performs a white paper data determination processing of determining whether or not the image data is white paper data. In the white paper data determination processing, the determination section 109 calculates an occupation ratio of white pixels included in pixels forming the target region. The determination section 109 determines that the image data is white paper data if the occupation ratio of the white pixels is equal to or more than a predefined threshold value, and determines that the image data is not white paper data if the occupation ratio of the white pixels is less than the predefined threshold value.

Moreover, the determination section 109, for example, performs the ACS processing of determining whether the image data is color data or monochromatic data. In the ACS processing, the determination section 109 calculates an occupation ratio of color pixels included in the pixels forming the target region. The determination section 109 determines that the image data is color data if the occupation ratio of the color pixels is equal to or more than a predefined threshold value, and determines that the image data is monochromatic data if the occupation ratio of the color pixels is less than the predefined threshold value. The aforementioned processing performed by the determination section 109 is performed in a case where the reception section 102 has received an instruction for executing document determination processing and a document determination function is enabled.

Figure 5A:
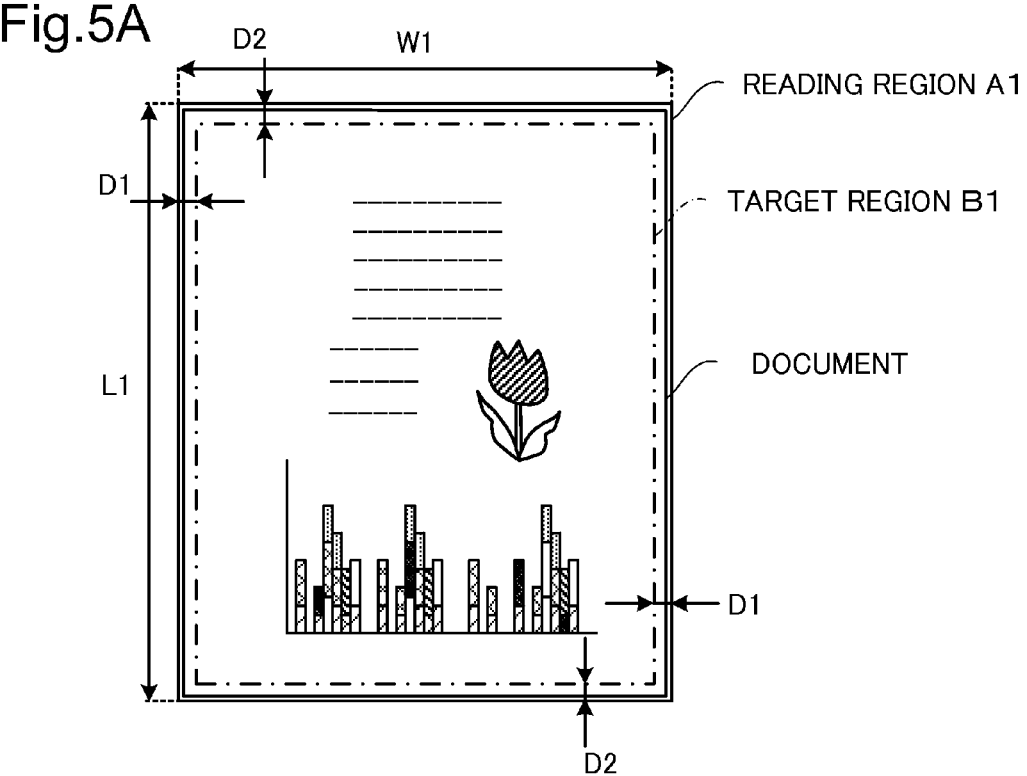
FIGS. 5A and 5B are views showing reading regions set by a reading region setting section and target regions to be analyzed by a determination section in the image reading device according to one embodiment of this disclosure.
Figure 5B:
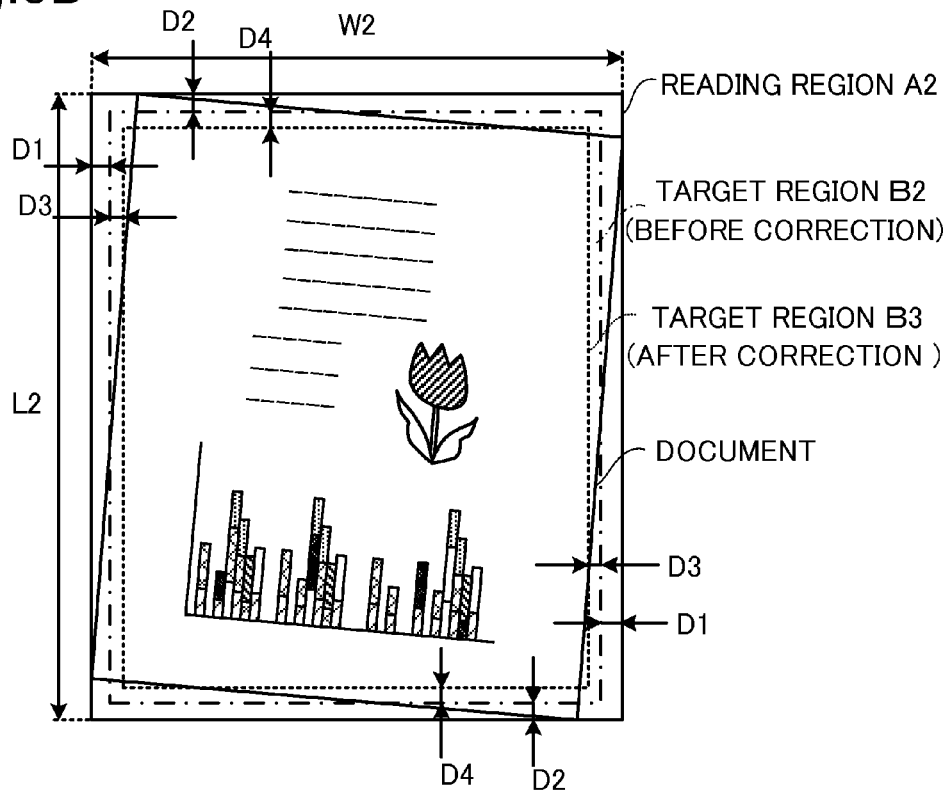

FIGS. 5A and 5B are views showing reading regions set by the reading region setting section 106 and target regions to be analyzed by the determination section 109. FIG. 5A shows the reading region and the target region in a case where the inclination correction function is disabled, and FIG. 5B shows the reading region and the target regions in a case where the inclination correction function is enabled.

As shown in FIG. 5A, if the inclination correction function is disabled, the reading region setting section 106 sets, as a reading region A1, a region equal to or slightly larger in size than a region defined based on the lengths of the document in the sub-scanning direction and the main-scanning direction which lengths have been detected by the document length detection section 105. In an example shown in FIG. 5A, the length of the reading region A1 in the sub-scanning direction is L1, and the length thereof in the main-scanning direction is W1.

The determination section 109 defines, as the target region, a region obtained by inwardly narrowing the reading region A1 by a first region. In the example shown in FIG. 5A, the determination section 109 sets, as a target region B1, a region obtained by inwardly narrowing the reading region A1 in the sub-scanning direction from a tip and a rear end thereof by a region of a length D2 each and by inwardly narrowing the reading region A1 in the main-scanning direction from left and right ends thereof by a region of a length D1 each. A size of the first region described above is previously stored in, for example, the storage section 70.

On the other hand, if the inclination correction function is enabled, in order to avoid image loss in the image data subjected to the inclination correction processing, a reading range needs to be set wide. Thus, the reading region setting section 106, as shown in FIG. 5B, sets, as a reading region A2, a region larger than the region defined based on the lengths of the document in the sub-scanning direction and the main-scanning direction which lengths have been detected by the document length detection section 105. As a result, the reading region A2 set when the inclination correction function is enabled is wider than the reading region A1 set when the inclination correction function is disabled (W2≥W1, L2≥L1).

In the reading region A2 set in this manner, as is the case where the inclination correction function is disabled, studied is a case where a region obtained by inwardly narrowing the reading region A2 in the sub-scanning direction from a tip and a rear end thereof by a region of a length D2 each and by inwardly narrowing the reading region A2 in the main-scanning direction from left and right ends thereof by a region of a length D1 each is set as a target region B2.

If the inclination correction function is enabled, the reading range is set wide in order to avoid the image loss in the image data subjected to the inclination correction processing, and thus the reading region A2 is wider than the reading region A1. In the target region B2, a large number of pixels generated by reading regions other than the document by the image reading section 30 are arranged, and not only the document but also the regions other than the document are read by the image reading section 30 to generate image data. As a result, in a case where the determination section 109 performs processing of determining an attribute of the image data in the target region B2, such as the white paper determination processing and the ACD processing, accuracy of this determination processing deteriorates.

Thus, the determination section 109 sets, as a target region B3, a region obtained by further inwardly narrowing the target region B2 by a predefined region. In other words, the determination section 109 sets, as the target region B3, a region obtained by inwardly narrowing the reading region A1 by a second region larger than the first reading region described above. Then the determination section 109 analyzes the image data in this set target region B3 and determines an attribute of the image data.

In an example shown in FIG. 5B, the determination section 109 sets, as the target region B3, a region obtained by inwardly narrowing the target region B2 in the sub-scanning direction from a tip and a rear end thereof by a region of a length D4 each and inwardly narrowing the target region B2 in the main-scanning direction from left and right ends thereof by a region of a length D3 each. That is, the determination section 109 sets, as the target region B3, a region obtained by inwardly narrowing the reading region A1 in the sub-scanning direction from the tip and the rear end thereof by a region of a length of D2+D4 each and inwardly narrowing the reading region A1 in the main-scanning direction from the left and right ends thereof by a region of a length of D1+D3 each. As a result, the determination section 109 can perform the document determination processing with high accuracy even when the inclination correction function is enabled.

The reception section 102, based on the user operation inputted by use of, for example, the operation keys 852 in accordance with the operation screen displayed at the display section 851, can receive an instruction for changing a size of the second region described above. The reception section 102, in this instruction for change, receives the lengths D3 and D4 described above as the size of the second region. At this point, the reception section 102 plays a role as a region reception section.

Figure 6:
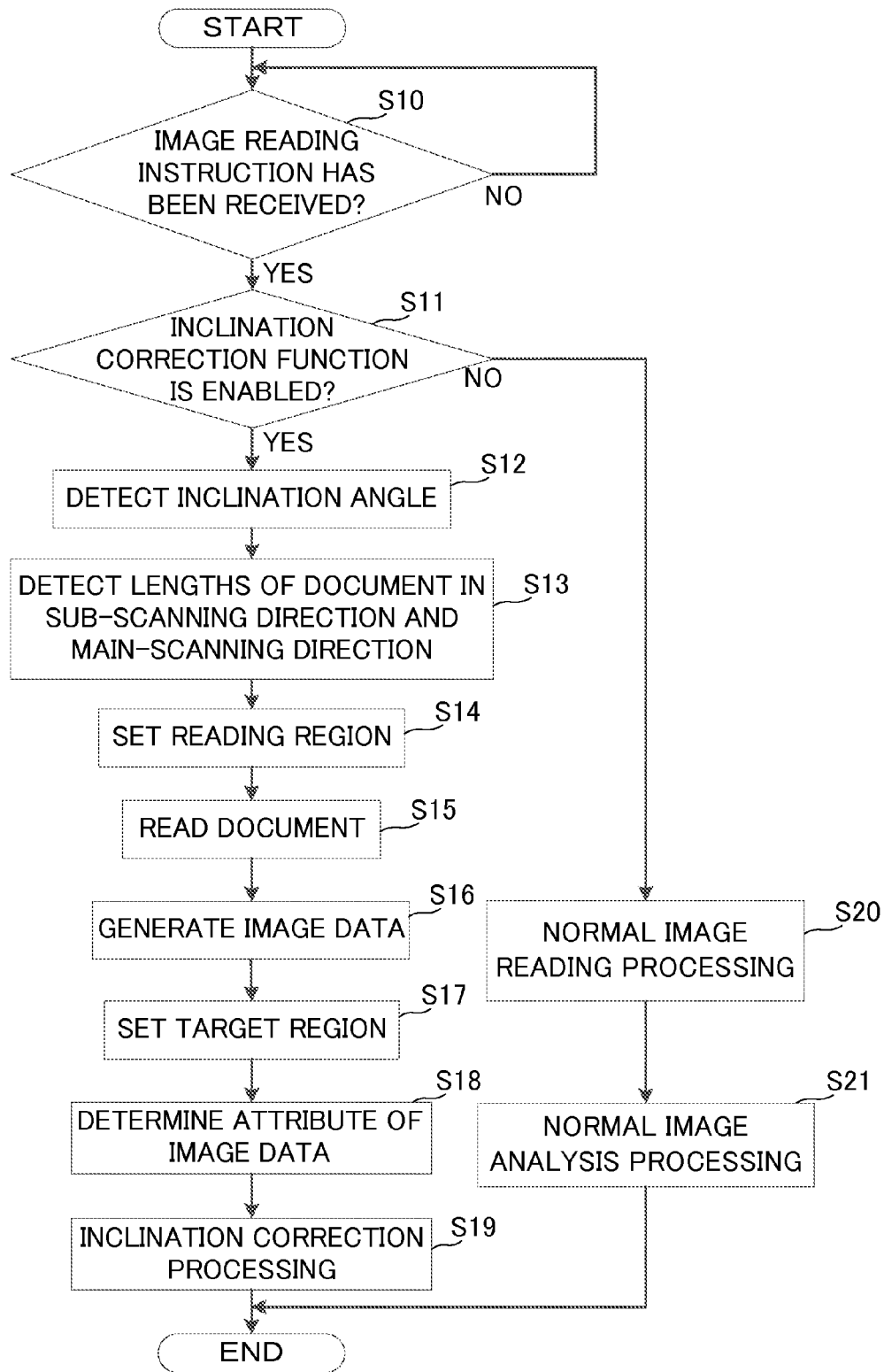
FIG. 6 is a flowchart showing a flow of operation performed by the image reading device according to one embodiment of this disclosure.

Next, operation performed by the image reading device 10 provided with the configuration described above will be described. FIG. 6 is a flowchart showing a flow of the operation performed by the image reading device 10.

If the reception section 102 has received the image reading instruction (YES in step S10), the control section 101 determines whether or not the inclination correction function is enabled (step S11).

If the inclination correction function is enabled (YES in step S11), the control section 101 controls operation of each mechanism of the image reading device 10 to start document reading operation. First, the inclination angle detection section 104, based on the signal outputted from the document detection sensor 66, detects the inclination angle of the document (step S12).

Moreover, the document length detection section 105, based on the signal outputted from the reading unit 40, the signal outputted from the guide plate detection sensor 27, the signal outputted from the document detection sensor 66, etc., detects the lengths of the document in the sub-scanning direction and the main-scanning direction (step S13).

The reading region setting section 106, based on the lengths of the document in the sub-scanning direction and the main-scanning direction which lengths have been detected in the processing of step S13, sets a range in which the document is read by the image reading section 30 (step S14). Since the inclination correction function is enabled, the reading region setting section 106 sets the reading region wider than the reading region set in a case where the inclination correction processing is not executed.

Then the control section 101 makes the image reading section 30 read the document in the reading region set in the processing of step S14 (step S15), and generate image data of the document (step S16).

The determination section 109, from the whole region of the image data generated in the processing of step S16, sets a target region targeted for the analysis processing (step S17). Since the inclination correction processing is enabled, the determination section 109 sets, as the target region, a region obtained by inwardly narrowing the whole region of the image data by the second region larger than the first region.

Then the determination section 109, in the target region set in the processing of step S17, analyzes the image data generated in the processing of step S16, and determines an attribute of the image data (step S18). The control section 101 displays, for example, at the display section 851, a result of the determination of the attribute of the image data.

After the processing of step 18, the inclination correction section 108 executes, on the image data generated in the processing of step S16, the inclination correction processing including, for example, the rotation processing and the size adjustment processing in accordance with the inclination angle detected in the processing of step S12 (step S19). The inclination correction section 108 stores the image data already subjected to this inclination correction processing into, for example, the storage section 70.

On the other hand, if the inclination correction function is disabled (NO in step S11), the control section 101 controls the operation of each mechanism of the image reading device 10 to cause normal image reading processing to be executed (step S20). In this normal image reading processing, the inclination angle is not detected by the inclination angle detection section 104. Moreover, the reading region setting section 106 sets, as the reading region, a region equal to or slightly larger in size than a region defined based on the lengths of the document in the sub-scanning direction and the main-scanning direction which lengths have been detected by the document length detection section 105.

After the processing of step S20, the determination section 109 executes normal image analysis processing (step S21). In this normal image analysis processing, a region obtained by inwardly narrowing the whole region of the image data by the predefined first region is set as the target region.

This disclosure is not limited to the configuration of the embodiment described above, and thus various modification thereto can be made.

The description for the flowchart shown in FIG. 6 refers to a case where the inclination angle of the document is detected (step S12) if the inclination correction function is enabled (YES in step S11) and in the subsequent processing of step S17, the region obtained by inwardly narrowing the whole region of the image data by the second region larger than the first region is set as the target region. However, this disclosure is not necessarily limited to this case. If the inclination correction function is enabled (YES in step S11), without performing the processing of detecting the inclination angle of the document in step S12, the processing of setting the target region in step S17 may be performed. That is, the processing of setting the target region in step S17 is executed if the inclination correction function is enabled and is not executed if the inclination correction function is disabled.

Moreover, the configuration of the document detection sensor 66 shown in the embodiment described above is one example, and this disclosure is not necessarily limited to this case. The image reading device 10 may include just a mechanism capable of detecting the inclination angle of the document and the length of the document in the sub-scanning direction in the document conveyance path 601.

Moreover, in the flowchart shown in FIG. 6, the inclination correction section 108 may perform processing of comparing the angle detected by the inclination angle detection section 104 with a predefined angle after the processing of step S12. Then the inclination correction section 108 executes the inclination correction processing in steps S13 beyond if the detected angle is equal to or more than the predefined angle. On the other hand, if the detected angle is less than the predefined angle, the inclination correction section 108 executes the normal image reading processing in step S20 and the normal image analysis processing in step S21 without executing the inclination correction processing in steps S13 beyond.

Moreover, the control program described in the embodiment above may be recorded in a computer-readable, non-transitory recording medium, for example, a hard disc, a CD-ROM, a DVD-ROM, or a semiconductor memory. In this case, the computer-readable, non-transitory recording medium on which this control program is recorded becomes one embodiment of this disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:
1. An image reading device comprising:
a reading region setting section setting a reading region of a document to be read;
an image reading section reading the document in the reading region set by the reading region setting section to generate image data;
an inclination correction section subjecting the image data generated by the image reading section to inclination correction processing in accordance with inclination of the document; and
a determination section defining a target region from a whole region of the image data generated by the image reading section and analyzing a portion of the image data corresponding to the document in the target region, thereby determining an attribute of the image data,
wherein the reading region setting section sets the reading region, which is set in a case where the inclination correction processing is executed, larger than the reading region, which is set in a case where the inclination correction processing is not executed, and
the determination section defines, as the target region, a region obtained by inwardly narrowing the whole region of the image data by a predefined first region in a case where the inclination correction processing is not executed, and defines, as the target region, a region obtained by inwardly narrowing the whole region of the image data by a second region larger than the first region in a case where the inclination correction processing is executed.

2. The image reading device according to claim 1, further comprising
a region reception section receiving a size of the second region,
wherein the determination section defines, as the target region, a region obtained by narrowing the whole region of the image data by the second region received by the region reception section.

3. The image reading device according to claim 1, further comprising
an instruction reception section receiving an execution instruction for executing the inclination correction processing,
wherein the inclination correction section executes the inclination correction processing in a case where the instruction reception section has received the execution instruction, and does not execute the inclination correction processing in a case where the instruction reception section has not received the execution instruction.

4. The image reading device according to claim 1, further comprising
an inclination angle detection section detecting an inclination angle of the document to be read,
wherein the inclination correction section executes the inclination correction processing in a case where the angle detected by the inclination angle detection section is equal to or more than a predefined angle, and does not execute the inclination correction processing in a case where the angle detected by the inclination angle detection section is less than the predefined angle.

5. The image reading device according to claim 1, wherein as a processing of determining an attribute of the image data, the determination section executes either of a processing of determining whether or not the image data is white paper data or a processing of determining whether the image data is color data or monochromatic data.

6. An image forming apparatus comprising:
the image reading device according to claim 1; and
an image formation section forming an image on recording paper based on the image data generated by the image reading device.

7. An image reading method comprising:
a reading region setting step of setting a reading region of a document to be read;
an image reading step of reading the document in the reading region set in the reading region setting step to generate image data;
an inclination correction step of subjecting the image data generated in the image reading step to inclination correction processing in accordance with inclination of the document; and
a determination step of defining a target region from a whole region of the image data generated in the image reading step and analyzing a portion of the image data corresponding to the document in the target region, thereby determining an attribute of the image data,
wherein, in the reading region setting step, the reading region, which is set in a case where the inclination correction processing is executed, is set larger than the reading region, which is set in a case where the inclination correction processing is not executed, and
in the determination step, a region obtained by inwardly narrowing the whole region of the image data by a predefined first region is defined as the target region in a case where the inclination correction processing is not executed, and a region obtained by inwardly narrowing the whole region of the image data by a second region larger than the first region is defined as the target region in a case where the inclination correction processing is executed.

* * * * *